United States Patent
Tyurina et al.

(10) Patent No.: US 10,478,773 B2
(45) Date of Patent: Nov. 19, 2019

(54) DEVICE, PROCESS, AND CATALYST INTENDED FOR DESULFURIZATION AND DEMERCAPTANIZATION OF GASEOUS HYDROCARBONS

(71) Applicant: START-CATALYST LLC, Moscow (RU)

(72) Inventors: Liudmila Aleksandrovna Tyurina, Moscow (RU); Alexander Ivanovich Tyurin, Moscow (RU); Irina Gennadievna Tarkhanova, Moscow (RU); Alexey Aleksandrovich Tyurin, Moscow (RU)

(73) Assignee: START-CATALYST LLC, Moscow (RU)

( * ) Notice: Subject to any disclaimer, the term of this patent is extended or adjusted under 35 U.S.C. 154(b) by 0 days.

(21) Appl. No.: 16/243,498

(22) Filed: Jan. 9, 2019

(65) Prior Publication Data

US 2019/0151797 A1 May 23, 2019

Related U.S. Application Data

(60) Continuation-in-part of application No. 16/222,344, filed on Dec. 17, 2018, which is a division of
(Continued)

(30) Foreign Application Priority Data

Apr. 25, 2016 (RU) .................................. 2016116049

(51) Int. Cl.
*B01D 53/52* (2006.01)
*B01D 53/86* (2006.01)
(Continued)

(52) U.S. Cl.
CPC ............. *B01D 53/52* (2013.01); *B01D 53/26* (2013.01); *B01D 53/263* (2013.01); *B01D 53/48* (2013.01);
(Continued)

(58) Field of Classification Search
None
See application file for complete search history.

(56) References Cited

U.S. PATENT DOCUMENTS 4,273,725 A * 6/1981 Cook, Jr. .............. C07C 329/00
558/249
4,855,070 A * 8/1989 Lewis .................. C10M 173/02
252/75

(Continued)

FOREIGN PATENT DOCUMENTS

CN 101747931 A * 6/2010
RU 2398735 C1 * 9/2010

OTHER PUBLICATIONS

RU-2398735-C1—english translation (Year: 2010).*
CN-101747931-A—english translation (Year: 2010).*

*Primary Examiner* — Melvin C. Mayes
*Assistant Examiner* — Stefanie J Cohen
(74) *Attorney, Agent, or Firm* — Nadya Reingand; Yan Hankin

(57) ABSTRACT

The invention is related to the sphere technologies for desulfurization and demercaptanization of gaseous hydrocarbons. It can be used for purification of any gaseous hydrocarbon medium. The device includes a catalytic reactor loaded with a catalyst solution in an organic solvent, a means of withdrawal sulfur solution from the reactor into the sulfur-separating unit, and a sulfur-separating unit. The sulfur-separation unit includes a means of sulfur extraction. The reactor design and the catalyst composition provide conversion of at least 99.99% of hydrogen sulfide and
(Continued)

mercaptans into sulfur and disulfides. The catalyst is composed of mixed-ligand complexes of transition metals. The technical result achieved by use of claimed invention is effectively a single-stage purification of gaseous hydrocarbons from hydrogen sulfide and mercaptans with remaining concentration of —SH down to 0.001 ppm while leaving no toxic waste.

3 Claims, 2 Drawing Sheets

Related U.S. Application Data application No. 15/539,867, filed as application No. PCT/RU2016/000415 on Jul. 4, 2016, now Pat. No. 10,213,740.

(51) Int. Cl.
  *B01D 53/26*  (2006.01)
  *B01J 31/00*  (2006.01)
  *B01D 53/48*  (2006.01)
  *B01J 27/122*  (2006.01)

(52) U.S. Cl.
  CPC ......... *B01D 53/86* (2013.01); *B01D 53/8603* (2013.01); *B01J 31/00* (2013.01); *B01D 2251/102* (2013.01); *B01D 2255/20738* (2013.01); *B01D 2255/20761* (2013.01); *B01D 2255/705* (2013.01); *B01D 2256/24* (2013.01); *B01D 2257/304* (2013.01); *B01D 2257/306* (2013.01); *B01J 27/122* (2013.01)

(56) References Cited

U.S. PATENT DOCUMENTS

| | | | |
|---|---|---|---|
| 7,087,547 B2 * | 8/2006 | Konovalov | B01J 27/122 502/104 |
| 8,735,316 B2 * | 5/2014 | Konovalov | C07F 1/005 502/169 |
| 2007/0099427 A1 * | 5/2007 | Oh | B82Y 30/00 438/692 |
| 2012/0129684 A1 * | 5/2012 | Vimont | B01D 53/8628 502/170 |

* cited by examiner

DEVICE, PROCESS, AND CATALYST INTENDED FOR DESULFURIZATION AND DEMERCAPTANIZATION OF GASEOUS HYDROCARBONS

CROSS-REFERENCE TO RELATED APPLICATIONS

The present patent application is a continuation-in-part of the U.S. patent application Ser. No. 16/222,344 filed Dec. 17, 2018, which claims priority to U.S. patent application Ser. No. 15/539,867 filed Jun. 26, 2017, now U.S. Pat. No. 10,213,740, which is the National stage patent application from PCT application PCT/RU2016/000415 filed Jul. 4, 2016, which claims priority to Russian patent application RU2016116049 filed Apr. 25, 2016, all of which incorporated herein by reference in their entirety.

FIELD OF INVENTION

This application is in sphere of technologies for desulfurization and demercaptanization of raw gaseous hydrocarbons (including natural gas, tail gas, technological gas, etc). It can be used for desulfurization and demercaptanization of any kind of raw gaseous hydrocarbons.

BACKGROUND

A prior art (RU patent No. 2394635, issued. 20 Jul. 2010) discloses a process for desulfurization and demercaptanization of gas based on absorption method. The gases to be purified are pressurized, and treated by two absorbing agents, first by water solution of neutral sodium salts of hydrosulfuric acid and of carbonic acid, and then by water solution of sodium hydroxide.

The same prior art describes a device for desulfurization and demercaptanization of gas as well as removal of carbon dioxide and other acidic additives, that includes two absorbers, each of them includes a storage vessel to hold absorbing agent and a pump that provides metered flow of absorbing agent into the absorber, where the second absorber, relatively to gas flow direction, contains solution of sodium hydroxide, and exhaust collecting vessels to collect exhaust absorbing agents. The absorbers are connected in a cascade; they are pressurized; the second absorber is equipped with a circulation pump; the exhaust collecting vessel of the first absorber is connected with a charging pump that is used to dump exhaust absorbing agent into isolated chambers, where as an absorbing agent in the first absorber, water and exhaust absorbing agent from the second absorber are used; additionally, the said device includes a compressor that maintains required pressure of the gas to be purified, and a separator that is connected to the said compressor, that is used to remove gas condensate and water.

As drawbacks of the said prior art, the following must be admitted: low purification performance, high alkali discharge rate, generation of a high amount of toxic waste that is hard to dispose of.

A prior art (U.S. Pat. No. 4,622,212, issued 11 Nov. 1986) describes a process of liquid-state oxidation of hydrogen sulfide to sulfur by means of chelating complexes of iron (Lo-Cat process). In the Lo-Cat process, a catalytic reactor for conversion of hydrogen sulfide into sulfur is used, and a device to regenerate the catalyst solution.

The said process features insufficient degree of desulfurization and incapability of demercaptanization that must be admitted as its drawbacks.

A prior art (U.S. Pat. No. 8,735,316, issued. 27 May 2014) describes a process of catalytic demercaptanization by converting mercaptans to disulfides. As a catalyst, the complex CuCl with monoethanol amine (MEA), acetonitrile, or with a monobasic alcohol is used. The process flows in presence of air oxygen, at a temperature of 22-140° C. The residual amount of mercaptan sulfur can be reduced to 20 ppm.

The said process is capable of purifying only liquid media, and no data is provided concerning its capability of hydrogen sulfide removal, that must be admitted as the drawbacks.

A prior art (RU patent No. 2385180 issued. 27 Mar. 2010) describes a Claus-process of obtaining sulfur from hydrogen sulfide by means of catalytic reaction of hydrogen sulfide and sulfur dioxide.

The said art features primary amine treatment of the gas to be purified, multiple stages of the process and insufficient conversion of hydrogen sulfide to sulfur, necessity of tail gas treatment, sophisticated technological equipment, and incapability of demercaptanization, all these items must be admitted as the drawbacks.

A prior art (U.S. Pat. No. 5,286,697, issued 15 Feb. 1994) also describes an improved Claus process.

The said art is also incapable of demercaptanization, and it is less efficient in hydrogen sulfide conversion.

A prior art (RU patent No. 2405738, issued 27 Apr. 2010) describes a process of sulfur recovery from industrial gases by means of a catalyst that contains on dehydroxylated silica gel (97.65% by mass) impregnated with ferric phosphate (III) (2.35%), that provides sulfur formation from hydrogen sulfide.

The said art features insufficient conversion of hydrogen sulfide, and catalyst production complexity, that must be admitted as drawbacks.

A prior art (RU patent No. 2398735, issued 10 Sep. 2010) describes a means of gas desulfurization by oxidating hydrogen sulfide to elemental sulfur in liquid state in presence of a catalyst, which contains a compound of a transition metal and an organic complexing agent. To oxidate hydrogen sulfide, it is proposed to use air oxygen as oxidizer; as a compound of transition metal, cupric halogenide is used, where the amount of copper in the solution is 0.015 to 0.1% by weight, and where as an organic complexing agents, one of the following is used: dimethylformamide, pyrrolidone, methylpyrrolidone, pyridine, or quinolone; the process flows in a solvent that is taken as one of the following: monobasic alcohol, polybasic alcohol, water, or their mixtures, kerosene, isooctane, gas condensate at temperature of 20-40° C.

The drawback of the said process is its mediocre efficiency.

SUMMARY

The technical problem that is solved by means of the proposed invention is to develop an engineering solution that provides desulfurization and demercaptanization with conversion over 99.999%.

The technical result achieved by use of the proposed engineering solution is a single-stage desulfurization/demercaptanization with residual amount of —SH down to 0.001 ppm while producing no toxic waste.

To achieve the said technical result, it is proposed to use a device (FIG. 1) and a process (FIG. 2) for desulfurization and demercaptanization of gaseous hydrocarbons, and a catalyst for efficient use of the said process. The proposed device includes a catalytic reactor loaded with a catalyst for $H_2S$ and RSH oxidation into sulfur and disulfides respectively in an organic solvent, an apparatus for withdrawal sulfur solution from the reactor to sulfur separation block, and a sulfur separation block, where the device includes at least a means of supplying gas to be purified and oxygen-containing gas into the reactor, a means of outputting the purified gas from the reactor; and where the sulfur separation block includes a means of sulfur segregation; and where the reactor design and catalyst composition provides conversion of at least 99.99% of hydrogen sulfide and mercaptans to sulfur and disulfides; and where the catalyst is composed of mixed-ligand complexes of transition metals.

While the gas is passed through the catalyst solution, hydrogen sulfide and mercaptans are converted into sulfur and disulfides in accordance with reaction:

$$H_2S + 2RSH + O_2 = S + RSSR + 2H_2O \qquad (1)$$

The purified gas is given out to the end user from the reactor outlet. The disulfides formed in reaction (1) remain in the reactor, and they do not affect the main process in any way. The water that evolves in reaction (1) is partially withdrawn from the reactor together with the purified gas, and partially—with fine sulfur suspension.

Fine sulfur suspension is withdrawn from the reactor into sulfur-separating unit. The sulfur-separation unit may include a means of sulfur separation from the solution with solution recycling into the reactor thereafter.

The device may additionally include a unit for homogenization of mixture of the gas to be purified with the oxygen-containing gas.

The reactor should preferably include a means of distribution of the supplied gas to be purified in the volume of the reactor, or filling plates.

The device may additionally include a means of metered supply of the catalyst.

As a catalyst, the device should preferably use mixed-ligand complexes based on ferric and/or cupric halogenides.

To achieve stated technical result, the developed process of purification of gaseous hydrocarbons from hydrogen sulfide and mercaptans may also be used.

According to the developed process, the raw gas to be purified is mixed with the oxygen-containing gas and passed through the reactor with organic solution of the catalyst that provides conversion of at least 99.99% of hydrogen sulfide and mercaptans into sulfur and disulfides, and where the catalyst is mixed-ligand complexes of transition metals.

The temperature in the device is preferably to be kept in range of 20-140° C.

In the described process embodiment, typically the amount of oxygen is taken not less than 50% of total amount of hydrogen sulfide and mercaptan sulfur.

The gas mixture supplied into the reactor is preferably to be evenly distributed in the reactor volume.

In the described process implementation, typically metered supply of the catalyst into the device is used, while the sulfur is separated from the suspension, and the solution is recycled into the reactor.

Typically, a catalyst is used that consists of mixed-ligand complexes of ferric and/or cupric halogenides.

Also, to achieve the stated technical result it is suggested to use the catalyst for desulfurization and demercaptanization of gaseous hydrocarbons that has the proposed composition. The said catalyst is a 0.0001-100% solution of ferric chloride and/or cupric chloride, amine, and amide, taken in a ratio of 1:20-1:0.1, in alcohol.

In the catalyst, preferably as amines, benzyl amine, cyclohexilamine, pyridine, and as amide-dimethylformamide are used.

DETAILED DESCRIPTION OF THE PREFERRED EMBODIMENT

Figure 1:
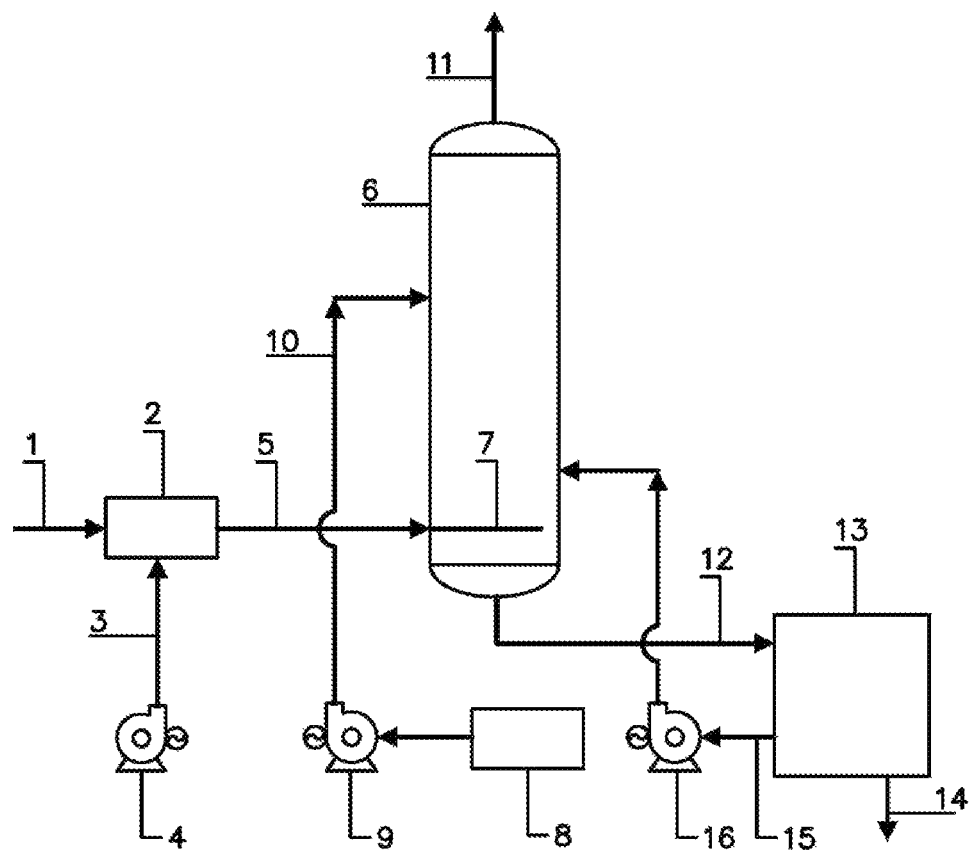
FIG. 1 shows the block diagram of the proposed device in the preferred embodiment
Figure 2:
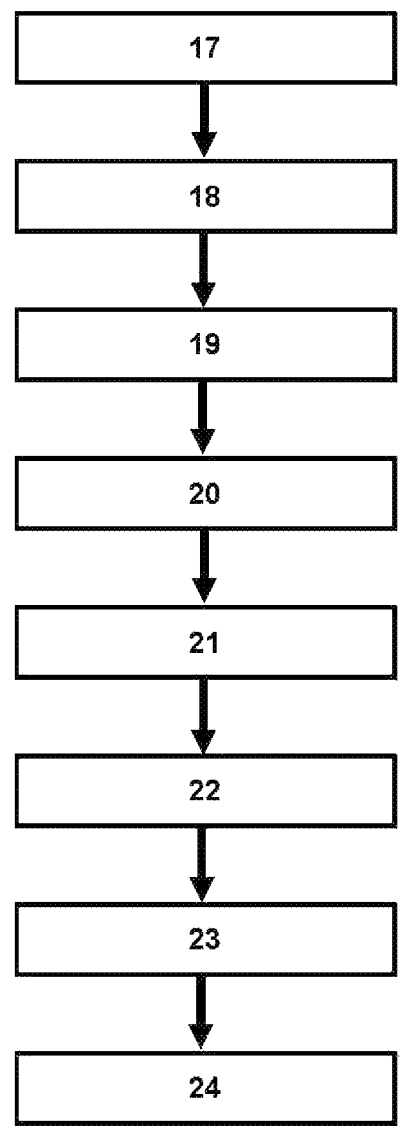
FIG. 2 shows the process according to the present invention.

FIG. 1 shows the block diagram of the proposed device in the preferred embodiment, where the following notations are used: inlet pipe 1 that supplies raw medium to be purified, mixing unit 2 that mixes hydrocarbon gas to be purified with oxygen-containing gas, inlet pipe 3 that supplies oxygen-containing gas, agitator 4 of oxygen-containing gas discharge, pipe 5 that supplies mixture of hydrocarbon gas to be purified with oxygen-containing gas, catalytic reactor 6, means 7 of distribution of mixture of hydrocarbon gas and oxygen-containing gas in the volume of reactor 6 or filling plates, tank 8 containing catalyst solution, agitator 9 of metered supply of catalyst solution from tank 8 into reactor 6, pipe 10 that supplies catalyst solution into reactor 6, pipe 11 that outlets purified gas, pipe 12 that outlets sulfur suspension into sulfur-separating unit 13, pipe 14 of sulfur outlet from sulfur-separating unit 13, pipe 15 that outlets catalyst solution from sulfur-separating unit 13 into catalytic reactor 6 after sulfur has been separated, agitator 16 of catalyst solution recycling from sulfur-separating unit 13 into catalytic reactor 6. The general stages or the process realization are shown in FIG. 2, where the following notation is used: supplying raw hydrocarbon material mixed with oxygen-containing gas to the reactor—17, passing the raw material through the reactor loaded with an organic solution of the catalyst—18, output of pure gas from the reactor, where the conversion of hydrogen sulfide and mercaptans to sulfur and disulfides is 99.99% —19, usage of oxygen, not less than 50% of total amount of hydrogen sulfide and mercaptan sulfur—20, distribution of gas mixture evenly in the reactor volume—21, metered supply of the catalyst into the reactor—22, separation of sulfur from the suspension and recycling of catalyst solution into the reactor—23, maintaining of temperature in the device in range of 25-140° C.—24.

As an agitator of oxygen-containing gas discharge, an air compressor can be used, as an agitator of catalyst solution supply from the tank—a metering pump, and as an agitator of catalyst solution recycling from sulfur-separating unit—a regular pump can be used.

Below, the essence and advantages of the developed technical solution are discussed in examples of practical implementation.

Example 1

Synthesis of catalyst C1. Into a retort, at a room temperature, 10 ml of ethyl alcohol, 100 ml of octane, 0.2-1 g of $CuCl_2 \cdot 2H_2O$ and 0.5-3 g of amine (benzylamine, cyclohexamine, pyridine) are put. The contents of the retort are mixed until cupric chloride dissolves completely. This composition of the catalyst is disclosed in (RU, patent No. 2405738, issued 27 Apr. 2010).

Example 2

Synthesis of catalyst C2. Into a retort, at a room temperature, 100 ml of ethyl alcohol, 20 ml of water, 20 ml (0.25 moles) of dimethylformamide (DMFA), and 15 g (0.09 moles) of $CuCl_2 \cdot 2H_2O$ are put. The contents of the flask are mixed until cupric chloride dissolves completely. This composition of the catalyst is known from (RU, patent No. 2398735, issued 10 Sep. 2010), however, even before the scientific research being a basis of current invention was finished, no data on demercaptanization capabilities of the said catalyst had been known.

Example 3

Synthesis of catalyst C3. Into a retort, at a room temperature, 100 ml of alcohol as solvent, 8-60 g of amine-dimethylformamide (DMFA) mixture, 1.5-14 g of $CuCl_2 \cdot 2H_2O$ are put. The contents of the flask are mixed until cupric chloride dissolves completely.

Example 4

Gas purification involving catalyst C1. The gas is purified with use of the device and the process that are claimed as the current invention, but C1 known from (RU, patent No. 2405738, issued 27 Apr. 2010) is used as the catalyst.

Non-aqueous organic solvent and catalyst C1 synthesized as in Example 1 are put into the reactor. The gas supplied into the reactor contains 0.1% vol. of hydrogen sulfide, 0.05% of mercaptan sulfur and 0.06% vol. of oxygen. The solution temperature is 25° C. The output gas contains, according to potentiometric titration results, 40 ppm and 50 ppm of hydrogen sulfide and mercaptan respectively. Conversion of hydrogen sulfide and mercaptan is 95.5 and 91% respectively.

Thus the device and the process claimed as the current invention even with use of a known catalyst composition (known from RU, patent No. 2405738, issued 27 Apr. 2010) provide conversion rate of hydrogen sulfide and mercaptan into sulfur and disulfides not more than 95.5%.

Example 5

Gas purification in accordance with current invention claim using catalyst C2. Non-aqueous organic solvent and catalyst C2 are put into the reactor. The gas supplied into the reactor contains 1% vol. of hydrogen sulfide, 0.05% SH and 0.5025% vol. of oxygen. The solution temperature is 25° C. The output gas contains, according to potentiometric titration results, 60 ppm of hydrogen sulfide and 60 ppm of mercaptan. Conversion of hydrogen sulfide and mercaptane is 99.4 и 88% respectively.

Thus examples 4 and 5 illustrate that even using of non-optimal catalyst composition the device and process claimed as current invention provide hydrogen sulfide conversion of 95.5-99.4% and mercaptan conversion of 88-91%.

Examples 6-24

Gas purification using catalyst C3 that utilizes the proposed process, catalyst and device.

Non-aqueous organic solvent and catalyst C3 with content of 0.001-100% are put into the reactor. The gas supplied into the reactor contains 0.1-1.8% vol. of hydrogen sulfide, 0.05-0.5% of mercaptans and 0.075-1.15% vol. of oxygen. The solution temperature is 20-40° C. The output gas according to potentiometric titration contains 10-0.001 ppm of hydrogen sulfide and 0.001-20 ppm of mercaptans. The conversion of hydrogen sulfide is 99.8-99.9999%, of mercaptan—98-99.9999%. The experiment results with use of different catalysts C1-C3 are shown in Table 1.

TABLE 1

| | | content, % mas. | | [$H_2S$] | | [RSH] | |
|---|---|---|---|---|---|---|---|
| | Catalyst | Amine + amide | Cu + Fe | in, % vol. | out, ppm | in, % vol | out, ppm |
| 4 | $C^1$ | 93 | 7 | 0.1 | 40 | 0.05 | 50 |
| 5 | $C2^1$ | 56 | 44 | 1 | 60 | 0.05 | 60 |
| 6 | $C3^2$ | 60 | 40 | 1 | 10 | 0.05 | 10 |
| 7 | $C3^2$ | 70 | 30 | 1 | 10 | 0.05 | 10 |
| 8 | $C3^1$ | 80 | 20 | 1.8 | 8 | 0.05 | 10 |
| 9 | $C3^1$ | 85 | 15 | 0.5 | 4 | 0.05 | 10 |
| 10 | $C3^{1,3}$ | 94 | 6 | 0.5 | 3 | 0.1 | 10 |
| 11 | $C3^{1,3}$ | 93 | 7 | 1.0 | 2 | 0.5 | 4 |
| 12 | $C3^{1,4}$ | 92 | 8 | 1.0 | 2 | 0.5 | 3 |
| 13 | $C3^{2,5}$ | 91 | 9 | 1.0 | 0.01 | 0.5 | 0.01 |
| 14 | $C3^{3,6}$ | 90 | 10 | 0.1 | 0.001 | 0.1 | 0.001 |
| 15 | $C3^{1,7}$ | 70 | 30 | 1.0 | 0.01 | 0.5 | 0.01 |
| 16 | $C3^{2,4}$ | 50 | 50 | 1.0 | 0.001 | 0.5 | 0.001 |
| 17 | $C3^{3,7}$ | 30 | 70 | 0.1 | 0.001 | 0.1 | 0.001 |
| 18 | $C3^{1,5}$ | 10 | 90 | 0.5 | 0.001 | 0.3 | 0.001 |
| 19 | $C3^{2,6}$ | 5 | 95 | 0.5 | 0.01 | 0.5 | 0.01 |
| 20 | $C3^3$ | 2 | 98 | 0.1 | 0.02 | 0.1 | 0.01 |
| 21 | $C3^1$ | 1 | 99 | 0.3 | 0.001 | 0.1 | 0.001 |
| 22 | $C3^1$ | 50 | 50 | 0.8 | 0.002 | 0.3 | 0.004 |
| 23 | $C3^{3,6}$ | 50 | 50 | 0.8 | 0.003 | 0.3 | 0.001 |
| 24 | $C3^{3,7}$ | 50 | 50 | 0.8 | 0.001 | 0.3 | 0.002 |

Solvents:
[1]alcohol, $\varepsilon$ = 20.4, 24.6, 3.7;
[2]glycol, $\varepsilon$ = 37.7;
[3]mixture of alcohol and/or glycol with others, $\varepsilon$ = 28.2; 34.8; 36.0; 38.0;
[4]DMFA, $\varepsilon$ = 36.7 or amine or amide;
[5]dimethylsulfoxide, $\varepsilon$ = 46.4;
[6]alcohol + hydrocarbon;
[7]alcohol + glycol + hydrocarbon In frame of current work, the following results were discovered:
- Using catalyst C1 with device and process claimed as current invention provide insufficient conversion of hydrogen sulfide and mercaptans, 95.5% and 91% respectively.
- Using catalyst C2 with device and process claimed as current invention provides not only desulfurization as in U.S. Pat. No. 2,398,735, issued 10 Sep. 2010, but also demercaptanization. Mercaptan conversion proves to be 88%.
- The catalyst proposed in current application catalyzed oxidation of both hydrogen sulfide and mercaptans with high degree of conversion, see Table 2.

Conversion of hydrogen sulfide and mercaptans in Examples 6-14 is shown in Table 2.

TABLE 2

| | No. | | | | | | | | |
|---|---|---|---|---|---|---|---|---|---|
| conversion, % | 6 | 7 | 8 | 9 | 10 | 11 | 12 | 13 | 14 |
| $H_2S$ | 99.0 | 99.9 | 99.96 | 99.8 | 99.9 | 99.9 | 99.98 | 99.999 | 99.9999 |
| RSH | 98.0 | 98.0 | 98.0 | 98.0 | 99.8 | 99.9 | 99.9 | 99.99 | 99.9999 |

Results of gas purification by proposed process and with proposed device and catalyst C3 with different ratio of amine/amide/transition metal are shown in Table 3. The conditions of experiment are similar to those of experiments No. 6-24.

TABLE 3

| | | Content, % mas. | | | [H$_2$S] | | [RSH] | |
|---|---|---|---|---|---|---|---|---|
| No. | catalyst | amine | amide | metal | in, % vol. | out, ppm | in, % vol. | out, ppm |
| 25 | C3 | 89 | 10 | 1 | 1 | 10 | 0.1 | 10 |
| 26 | C3 | 45 | 50 | 5 | 1 | 10 | 0.1 | 10 |
| 27 | C3 | 40 | 50 | 10 | 1 | 4 | 0.1 | 6 |
| 28 | C3 | 10 | 70 | 20 | 1 | 4 | 0.1 | 6 |

Results of gas purification by proposed process and with proposed device and catalyst C3 in various solvents with ratio of amine/amide/transition metal=4:5:1 are shown in Table 4. The conditions of experiment are similar to those of experiments No. 6-24.

TABLE 4

| | | [H$_2$S] | | [RSH] | |
|---|---|---|---|---|---|
| catalyst | solvent | in, % vol. | out, ppm | in, % vol. | out, ppm |
| C3 | octane | 1 | 4 | 0.1 | 6 |
| C3 | naphtha | 1 | 10 | 0.1 | 10 |
| C3 | petrol | 1 | 10 | 0.1 | 10 |

Results of gas purification by proposed process and with proposed device, with different content of catalyst C3 are shown in Table 5. The conditions of experiment are similar to those of experiments No. 6-24.

TABLE 5

| | [C3], | [H$_2$S] | | [RSH] | |
|---|---|---|---|---|---|
| No | % vol. | in, % vol. | out, ppm | in, % vol. | out, ppm |
| 29 | 0.001-0.5 | 1 | 10 | 0.1 | 12 |
| 30 | 1-5 | 1 | 4 | 0.1 | 6 |
| 31 | 10 | 1 | 0.001 | 0.1 | 0.01 |

Results of gas purification where the gas has different content of methane, ethane, C$_{3+}$ by proposed process and with proposed device and catalyst C3 are shown in Table 6. The conditions of experiment are similar to those of experiments No. 6-24.

TABLE 6

| | | content, % vol. | | | [H$_2$S] | | [RSH] | |
|---|---|---|---|---|---|---|---|---|
| No. | catalyst | C$_1$ | C$_2$ | C$_{3+}$ | in, % vol. | out, ppm | in, % vol. | out, ppm |
| 32 | C3 | 85 | 12 | 3 | 1 | 10 | 0.1 | 10 |
| 33 | C3 | 74 | 22 | 4 | 1 | 10 | 0.1 | 10 |
| 34 | C3 | 100 | | | 1 | 10 | 0.1 | 10 |
| 35 | C3 | 95 | 5 | | 1 | 4 | 0.1 | 5 |

The examples provided confirm that the stated technical result is achieved, yet they do not show the limits of proposed technical solution.

It will be understood that the system and method may be embodied in other specific forms without departing from the spirit or central characteristics thereof. The present examples and embodiments, therefore, are to be considered in all respects as illustrative and not restrictive, and the system method is not to be limited to the details given herein.

What is claimed is:

1. A catalyst for desulfurization/demercaptanization of gaseous hydrocarbons, comprising:
    a ferric chloride, a cupric chloride, or a mixture thereof, forming a first mixture,
    a mixture of one or more amines and one or more amides including dimethylformamide (DMF), forming a second mixture,
    wherein said first mixture and said second mixture are dissolved in one or more non-aqueous solvents, wherein the catalyst comprises 50 percent weight of the second mixture and 50 percent weight of the first mixture before being dissolved in the one or more non-aqueous solvents, said non-aqueous solvents comprising glycol or DMF.

2. A catalyst for desulfurization/demercaptanization of gaseous hydrocarbons, comprising:
    a ferric chloride, a cupric chloride, or a mixture thereof, forming a first mixture,
    a mixture of one or more amines and one or more amides including dimethylformamide (DMF), forming a second mixture,
    wherein said first mixture and said second mixture are dissolved in one or more non-aqueous solvents, wherein the catalyst comprises at most 50 percent weight of the second mixture and at least 50 percent weight of the first mixture before being dissolved in the non-aqueous solvent, said non-aqueous solvent comprising glycol and DMF.

3. A catalyst for desulfurization/demercaptanization of gaseous hydrocarbons, comprising:
    a ferric chloride, a cupric chloride, or a mixture thereof, forming a first mixture,
    a mixture of one or more amines and one or more amides including dimethylformamide (DMF), forming a second mixture,
    wherein said first mixture and said second mixture are dissolved in one or more non-aqueous solvents, wherein the catalyst comprises at most 50 percent weight of the second mixture and at least 50 percent weight of the first mixture before being dissolved in the non-aqueous solvent, said non-aqueous solvent comprising glycol and dimethylsulfoxide.

* * * * *